May 30, 1961  J. K. MUREK  2,986,120
ACTUATING PRESSURE VALVE SYSTEM
Filed March 29, 1960  2 Sheets-Sheet 1
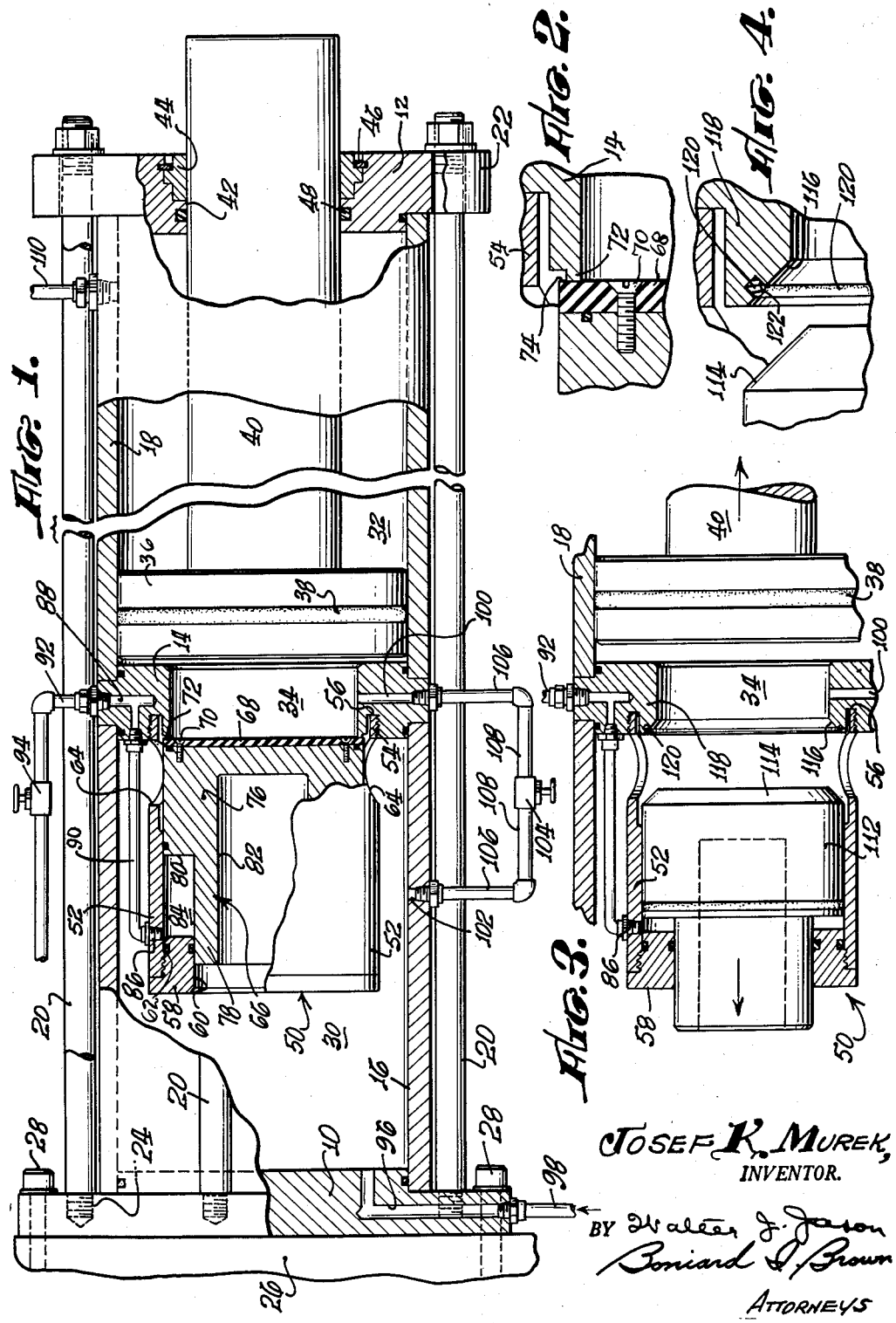
JOSEF K. MUREK,
INVENTOR.
BY Walter J. Jason
Boniard L. Brown
ATTORNEYS May 30, 1961  J. K. MUREK  2,986,120
ACTUATING PRESSURE VALVE SYSTEM
Filed March 29, 1960  2 Sheets-Sheet 2

JOSEF K. MUREK,
INVENTOR.

BY
ATTORNEYS

United States Patent Office 2,986,120
Patented May 30, 1961

2,986,120
ACTUATING PRESSURE VALVE SYSTEM

Josef K. Murek, Pomona, Calif., assignor to General Dynamics Corporation, San Diego, Calif., a corporation of Delaware Filed Mar. 29, 1960, Ser. No. 18,303

18 Claims. (Cl. 121—38)

The present invention relates generally to pressure release devices; more particularly, it relates to a system for the controlled rapid release of actuating pressure.

The present invention provides very rapid accurately controlled release of pressure, and represents improvements upon the invention described and claimed in United States Patent Number 2,925,803 to Jack B. Ottestad, entitled "Actuating Pressure Release System." That invention provides an actuating pressure release system wherein a release piston and an actuator piston confront opposite sides of an orifice wall. The wall and the release piston are adapted for cooperation to provide a pressure seal about the orifice, and the release piston is urged by a set force into engagement with the wall to establish the seal. An actuating pressure acts on an area of the release piston outside the pressure seal to oppose the set force. The actuating pressure is very rapidly release through the orifice by impelling the release piston from the orifice wall, either by increasing the actuating pressure to overbalance the set force or by utilizing a separate triggering force to cooperate with the actuating pressure to overbalance the set force. The overbalancing unseats the release piston from the orifice wall, thereby eliminating the pressure seal and releasing the actuating pressure upon the release piston area within the seal to rapidly accelerate the release piston from the wall.

The devices of the aforementioned patent are characterized by certain shortcomings and disadvantages. Both an actuating pressure and a separate set pressure must be provided, thus requiring separate pressure supply systems. Special structure must be utilized for decelerating the release piston. Such a device cannot function as a true valving device wherein the release piston effects controlled release of pressure to the atmosphere or to a lower pressure system, because triggering requires that the actuator piston or another member first be positioned on the opposite side of the orifice wall to retain pressure within the orifice. The release system assembly of such a device may be subjected to undesirably high dynamic loading under the conditions of high rate pressure-time output performance.

The present invention provides an improved pressure valve system for the controlled rapid release of pressure, and it achieves the general objects and advantages of the invention of the above-identified patent. An actuator piston and a valve piston confront opposite sides of an orifice wall. The valve piston and the orifice wall are adapted for cooperation to provide a pressure seal about the orifice. An actuating pressure is established to act upon a portion of the valve piston to exert a set force urging the valve piston toward the wall to effect the pressure seal, and this same actuating pressure acts upon a portion of the valve piston outside the pressure seal to oppose the set force. The valve piston is impelled from the orifice wall to effect a very rapid release of the actuating pressure through the orifice. This is accomplished by overbalancing the set force by means of a triggering force or pressure which cooperates with the actuating pressure force on the valve piston portion outside the pressure seal. The overbalancing unseats the valve piston from the orifice wall and suddenly eliminates the pressure seal, thereby suddenly releasing the actuating pressure upon the piston area defined by the pressure seal. The triggering force may be provided by applying a triggering pressure to the valve piston area within the pressure seal and confronting the orifice. This triggering pressure may be the actuating pressure or it may be a separate pressure. In preferred embodiments of the invention, a triggering force is provided by applying triggering pressure to a transverse shoulder area of the valve piston. Such embodiments are capable of functioning as true valves in releasing pressure directly to a lower pressure system or to atmosphere, because no actuating piston or other element is required to close the orifice in order to retain pressure for triggering. Special structure is not required for decelerating the valve piston. An output pressure-time pattern may be governed by utilizing a metering pin either on the valve piston or on the actuating piston. The metering pin extends into the orifice and cooperates with the orifice wall in regulating the release of pressure through the orifice in the manner described in the copending application of Jack B. Ottestad and Samuel A. Skeen for "Pneumatic Actuator," Serial No. 683,855, filed September 13, 1957, now Patent No. 2,949,096.

It is therefore an object of the present invention to alleviate or obviate the aforementioned shortcomings and disadvantages by providing a novel and improved pressure valve system.

An object of this invention is the provision of a novel and improved pressure valve system for the controlled high rate application of pressure.

It is an object of the present invention to provide a pressure valve capable of releasing pressure through an orifice directly to a lower pressure system.

An object of the present invention is the provision of a pressure valve system wherein an actuating pressure exerts a set force on a valve piston to urge it toward an orifice wall to effect a pressure seal and wherein the same pressure exerts an opposing force on a portion of the piston outside the pressure seal, thereby preparing the system to be operated by the application of a triggering force to the piston to overbalance the set force.

It is an object of the invention to provide a pressure valve system according to the foregoing object wherein a triggering force is applied by the application of a triggering pressure to a transverse area of a valve piston.

An object of this invention is the provision of a pressure valve system according to certain of the foregoing objects wherein the valve piston and a cooperating casing define a cushion pressure chamber for applying pressure to a transverse valve piston area to decelerate the piston and to reseat it for repeat operation.

It is an object of the present invention to provide an actuator the output of which is substantially unrestricted by orifice losses or by internal forces.

An object of the invention is the provision of a pressure valve system according to certain of the foregoing objects which requires no special structure for decelerating the valve piston.

It is an object of the present invention to provide a pressure valve system capable of rapid controlled pressure release with low orifice losses.

Another object of this invention is the provision of a pressure valve system according to the foregoing objects wherein special sealing means are utilized to provide a pressure seal between the valve piston and the orifice wall.

It is an object of the invention to provide a pressure valve system wherein a pressure-time output pattern is controlled by cooperation between a contoured metering member and an orifice wall.

Other objects and features of the present invention, as well as many advantages thereof, will become apparent to those skilled in the art from a consideration of the following description, the appended claims and the accompanying drawings, wherein:

Figure 1 is an elevational view, partially in section, of a preferred embodiment of the pressure valve system of the present invention;

Figure 2 is a fragmentary sectional view showing details of a portion of the pressure valve system of Figure 1;

Figure 3 is a fragmentary sectional view wherein a modified form of the pressure valve system of Figure 1 is shown in operation;

Figure 4 is a fragmentary sectional view showing details of a portion of the pressure valve system of Figure 3;

Figure 5:
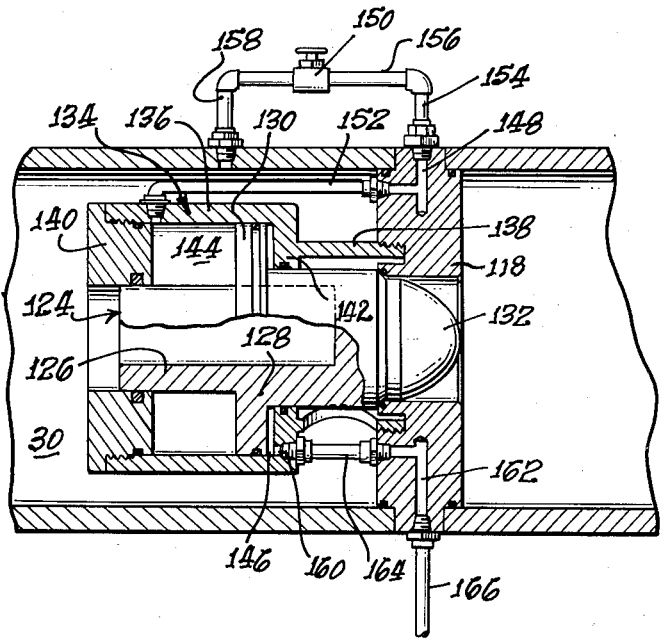
Figure 5 is a partial elevational sectional view of another embodiment of the pressure valve system of the present invention.

Referring to the drawings, and particularly to Figures 1 and 2, there is shown a preferred embodiment of the pressure valve system of the present invention. The device includes a housing assembly formed by a base member 10, an end member 12, an orifice plate or wall 14, and cylindrical sections 16, 18, all of which are secured in clamped relation by tie-bolts 20. Each of the tie-bolts extends through an appropriate opening in a flange portion 22 of the end member 12 and is secured in a threaded opening 24 in the base member 10. The assembly is secured to a wall or foundation 26 by bolts 28 which extend through openings in a flange portion of the base member. The cylindrical housing is separated into an actuating pressure chamber 30 and a pressure chamber 32 by the orifice wall 14. An orifice 34 is provided in the orifice plate for purposes hereinafter described. Pressure sealing is provided for chambers 30, 32 by resilient seal rings in appropriate grooves in the orifice wall 14, base member 10, and the end member 12, as shown.

As actuator piston 36 is slidable in chamber 32 and is adapted to seat against the orifice plate, as shown in Figure 1. An annular seating element 38 in a peripheral groove in the piston provides pressure sealing between cylindrical section 18 and the piston. A thrust column 40 is secured to the actuator piston and extends through an axial opening 42 in end member 12. The column is slidably received in a bearing 44 secured within an enlarged portion of the opening by a locking ring 46. A resilient ring 48 in an appropriate groove within the opening provides pressure sealing about the thrust column.

A release system assembly 50 is secured to the side of the orifice wall 14 opposite from the actuator piston 36. A cylindrical casing member 52 has its threaded end portion 54 secured in a threaded annular recess 56 about the orifice 34 in the orifice plate, as shown. A cap member 58 is threadedly secured in the outer end portion of the casing 52, and has a large axial opening 60. A resilient seal ring in a groove in the cap member provides pressure sealing between this member and casing 52. The cylindrical member 52 and the cap member constitute a release system casing. Circular ports 64 in the casing 52 are provided for a purpose hereinafter indicated.

A valve piston 66 is slidable in the casing 52 and confronts the orifice plate. A circular resilient sealing element or plate 68 is secured by screws 70 to the piston in confronting relation with the orifice plate, and an annular seal ring is provided between the sealing element and the piston. As shown in Figures 1 and 2, a circular sealing rim 72 is defined in the orifice wall 14 and encircles the orifice 34. The sealing element 68 and the sealing rim 72 effect a circular pressure seal between the valve piston and the orifice wall when the piston is urged into engagement with the rim 72. As indicated in Figures 1 and 2, an annular portion or area 74 of the valve piston or of sealing element 68 is disposed outside this circular pressure seal.

The valve piston 66 comprises an axially extending enlarged flange portion 76, in sliding engagement with the casing 52, and an axially extending reduced portion 78, these portions being separated by a transverse shoulder area 80. A large axial opening 82 is defined in the valve piston and extends inwardly from the end opposite from the orifice plate. A resilient seal ring in an appropriate peripheral groove in the enlarged portion 76 provides pressure sealing between the casing and the enlarged pison portion. The reduced portion 78 of the valve piston is slidable in axial opening 60 of cap member 58, and a sealing ring is mounted between these members in a groove in the cap member.

The casing 52, reduced piston portion 78, the shoulder area 80 and end cap 58 cooperate to define an expansible cushion pressure chamber 84, as shown.

A port 86 in the casing, a passage 88 in the orifice wall, fluid couplings 90, 92 and a three-way valve 94 connect the cushion pressure chamber 84 with a source of cushion pressure and a source of reseating pressure (not shown). Actuating pressure chamber 30 communicates with a source of actuating pressure (not shown) through a passage 96 in base plate 10 and a fluid coupling 98. A radial passage 100 in the orifice wall, a port 102 in cylinder 16, a three-way valve 104 and pipes 106, 108 interconnect the actuating pressure chamber 30 and the orifice 34. A fluid coupling 110 provides means for introducing pressure from another source (not shown) into chamber 32.

To prepare the pressure valve system of Figure 1 for operation, a relatively low cushion pressure is introduced into cushion pressure chamber 84 by means of the three-way valve 94 through coupling 92, passage 88 and opening 86 in cylindrical casing 52. A relatively high actuating pressure is established in chamber 30 through passage 96 and coupling 98. The actuating pressure acts upon the effective cross-sectional area of the valve piston 66 defined within the resilient seal ring in cap member 58. A set force is thereby produced which urges the valve piston against the orifice wall 14 and compresses resilient seal plate 68 against the sealing rim 72 to effect a positive pressure seal between the valve piston and the orifice wall about the orifice 34. The actuating pressure in chamber 30 acts through the ports 64 in cylindrical casing 52 and exerts a force on the annular valve piston portion 74 radially outside the pressure seal. This force opposes the set force on the piston, and may be predetermined to substantially balance the set force to hold the piston in a state of equilibrium.

To operate the pressure valve device of Figure 1, a triggering pressure is released upon the valve piston area defined within the pressure seal at sealing rim 72 by means of the three-way valve 104 which releases actuating pressure from chamber 30 into the orifice 34 through couplings 106, 108 and passage 100. The valve 104 may be operated for only a brief interval to introduce only a fraction of the actuating pressure into the orifice, or it may be maintained open to introduce the full actuating pressure. In cooperation with the actuating pressure force on the annular valve piston portion 74 outside the pressure seal, the triggering pressure unbalances the opposing forces on the piston. The valve piston is thereby unseated from the orifice plate and the sealing element 68 is disengaged from the rim 72. With the pressure seal thus eliminated, the high actuating pressure is released substantially instantaneously upon the valve piston area defined within the sealing rim 72. The valve piston is thereby impelled at high acceleration from the orifice wall 14, as indicated in Figure 3, and the actuating pressure is released substantially instantaneously through the orifice upon the entire area of the actuator piston 36 defined by its peripheral sealing element 38. The actuator piston is suddenly impelled with great force from the orifice wall to produce high level actuator output.

It will be understood that the acceleration of the valve piston and the rapidity of release of actuating pressure are proportional to the ratio of the valve piston area within the pressure seal to the annular valve piston area 74 outside this pressure seal. An increase of the area within the pressure seal is accompanied by a corresponding increase in the size of the orifice. Therefore, an increase in the rapidity of pressure release is accompanied by correspondingly decreased orifice losses. It will be readily appreciated that movement and acceleration of the actuator piston is not opposed by substantial pressures or forces within the device.

Deceleration of the valve piston is effected by the actuating pressure in chamber 30 and by compression in the cushion chamber 84. The actuating pressure continuously exerts the set force hereinbefore described on the cross-sectional area of the valve piston 66 within the sealing element in the cap member 58, and this force serves as a decelerating force.

To prepare the device of Figure 1 for repeat operation, the valve piston 66 and the actuator piston 36 are reseated against the orifice wall 14. The actuator piston may be reseated by introducing a relatively low pressure into chamber 32 through pipe 110 or by mechanical force on the thrust column 40. Pressure within the orifice 34 may be relieved to facilitate reseating. To reseat the valve piston pressure is introduced into chamber 84 by means of the three-way valve 94, coupling 92, passage 88 and opening 86. If the pressure within the orifice is not relieved the reseating pressure provided in chamber 84 must be higher than the actuating pressure. The pressure in this chamber acts upon the transverse shoulder area 80 to move the valve piston toward the orifice plate against the opposing force of the actuating pressure on the opposite end of the piston. After reseating, the reseating pressure in chamber 84 is relieved and a relatively low cushion pressure is permitted to remain in the chamber.

Upon the reseating of the pistons, trapping of pressure in the space defined within the orifice (between sealing rim 72 and peripheral actuator piston seal 38) is prevented by relieving pressure through passage 100, couplings 106, 108 and the three-way valve 104. Pressure trapped in this space would act upon the valve piston area within the sealing rim 72 and would oppose the set force exerted oppositely on the valve piston. A relatively low pressure within the orifice would then effect movement of the valve piston from the orifice wall. This would prevent effective triggering and would cause prematurely relatively slow movement of the valve piston, thereby preventing effective operation of the device.

From the foregoing description, it will be understood that a separate set pressure system is not required. A single actuating pressure exerts both the set force on the valve piston to establish the pressure seal and the opposing force on a portion of the valve piston outside the pressure seal, thereby preparing the system to be operated by an overbalancing triggering force. It will also be appreciated that no special structure is required either to decelerate or to reseat the valve piston. The cushion pressure chamber defined by the valve piston and the casing accommodates appropriate pressures for decelerating the piston and for reseating the valve piston to prepare the device for repeat operation.

Figures 3 and 4 illustrate a somewhat modified form of the pressure valve system of the invention wherein modified sealing means are utilized for effecting the pressure seal between the valve piston and the orifice wall. A modified valve piston 112 has a tapered end portion 114 confronting an inclined surface 116 of an orifice wall 118. A resilient sealing element 120 is bonded in an annular groove 122 in the inclined surface 116. Compression of the resilient element 120 against the tapered end portion 114 of the piston by the set force effects the pressure seal about the orifice. Operation of the device of Figure 3 is otherwise the same as that hereinbefore described in connection with the embodiment shown in Figure 1.

In Figure 5 is shown a modified pressure valve system according to the invention. This embodiment is adapted to be utilized as a true pressure release valve, and differs from the embodiment hereinbefore described in that no actuator piston is utilized. It differs further in that a type of valve piston 124 is uitlized which has two axially extending reduced portions 126, 128 separated by an enlarged flange portion 130. A metering pin 132 is provided on the valve piston for a purpose hereinafter described.

A casing 134 has an enlarged cylindrical portion 136 and a reduced portion 138 which is threadedly secured in an annular orifice plate recess like the recess 56 shown in Figure 1. A cap member 140 is threadedly secured in the end portion of the casing 134. Enlarged piston portion 130 slidably engages casing portion 136 and reduced piston portion 128 is in sliding engagement with an inwardly extending portion 142 of the casing. A cushion pressure chamber 144 is defined by the casing 134, the cap member 140, reduced piston portion 126 and an enlarged piston portion 130. The casing, piston portion 130 and piston portion 128 cooperate to define a triggering pressure chamber 146, as shown.

A port in casing 134, a passage 148 in the orifice wall, a three-way valve 150, a port in the housing wall and couplings 152, 154, 156, 158 connect the cushion pressure chamber 144 with the actuating pressure chamber 30. A port 160 in the casing, a passage 162 and fluid couplings 164, 166 interconnect the triggering pressure chamber 146 with a source of triggering pressure (not shown).

The operation of the embodiment shown in Figure 5 differs from that hereinbefore described primarily in the manner in which the operation of the valve piston is triggered. It also differs in that a metering member is utilized. As in the operation of the device of Figure 1, actuating pressure exerts a set force on the valve piston and a pressure seal is established between the valve piston and the orifice wall. The actuating pressure also exerts an opposing force on a portion of the piston outside the pressure seal. Cushion pressure in the chamber 144 assists in decelerating the valve piston.

To actuate the device shown in Figure 5, a triggering pressure is introduced into the triggering pressure chamber 146 through passage 162, couplings 164, 166 and opening 160 in casing 134. The triggering pressure may be the actuating pressure introduced from chamber 30 through these couplings or it may be a separate pressure. The triggering pressure acts on the transverse area of enlarged piston portion 130 and cooperates with the actuating pressure force on the annular piston area outside the pressure seal about the orifice to overbalance the set force. The valve piston is thereby unseated from the orifice wall to eliminate the pressure seal, and the operation of the system thereafter is the same as that hereinbefore described for the device of Figure 1.

From the foregoing description, it will be understood that the embodiment shown in Figure 5 is capable of operation as a true valve in releasing pressure to atmosphere or to a lower pressure system. Such operation as a true release valve cannot be effected with the embodiment shown in Figure 1 or with the devices disclosed in the aforementioned patent, because those devices require pressure to be confined within the orifice, as by an actuator piston, in order to trigger the operation of the valve piston. This is an important feature of the invention and greatly increases its utility because pressure may be released through the orifice to a lower pressure system to be utilized for any desired purpose.

For repeat operation of the device, the valve piston and the actuator piston are reseated against the orifice wall in the manner hereinbefore described.

An auxiliary safety feature is provided by the device of Figure 5. By establishing the actuating pressure or a greater pressure in the cushion chamber 144, operation of the device is prevented. The transverse shoulder area of the enlarged piston portion 130 which confronts the triggering pressure chamber 146 is smaller than the combination of the transverse area of piston portion 130 which confronts the chamber 144 and of the cross-sectional area of the piston acted upon by the actuating pressure in chamber 30. Therefore, the actuating pressure or a greater pressure in chamber 144 effectively prevents triggering of the device.

A relatively larger orifice may be utilized in this embodiment because the reduced piston portion 126 is smaller than reduced piston portion 128 and because the piston area defined within the sealing rim 72 is greater than the cross-sectional area of reduced portion 126. The relatively large area within the pressure seal at rim 72 requires that a relatively substantial reseating pressure be established in the cushion chamber 144 to reseat the valve piston.

Figure 6:
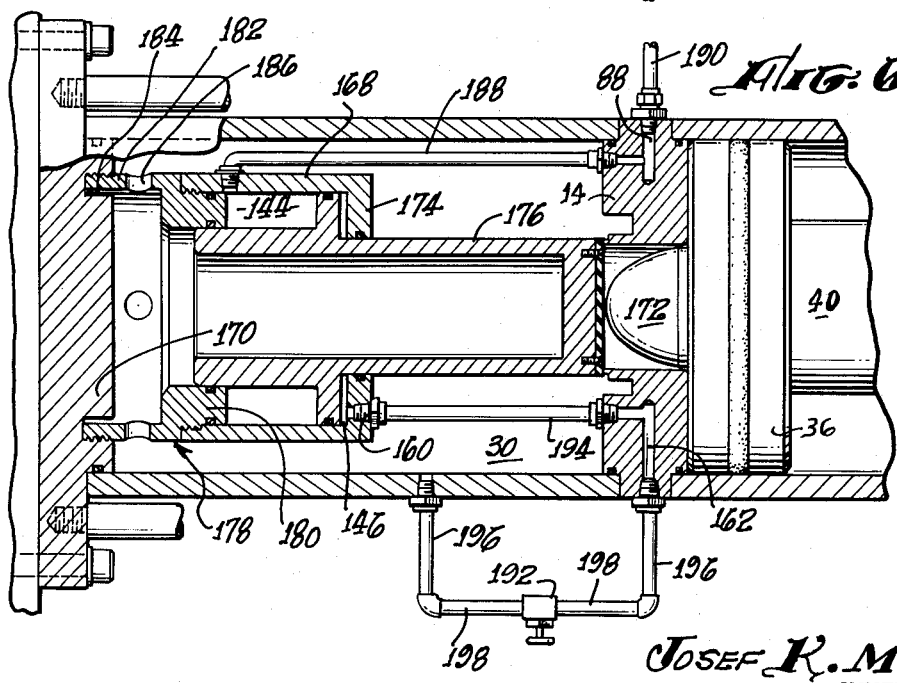
Figure 6 is an elevational sectional view of another modified form of the pressure valve system of the present invention.

Referring to Figure 6, there is shown an embodiment of the invention which is generally similar to that of Figure 5, but which differs in that a release system casing is secured to a base member 170 instead of to the orifice wall, and in that a metering pin 172 is provided on the actuator piston. The casing 168 has an inwardly extending flange portion 174 in sliding engagement with an elongated reduced piston portion 176. A cap member 178 has its threaded end portion 180 secured in the casing 168 and its opposite portion 182 threaded in an annular recess 184 in base member 170. Circular openings 186 in the portion 182 provide for communication of actuating pressure to the valve piston. In other respects, the valve piston, the casing, cushion pressure chamber 144 and trigger pressure chamber 146 are similar to those shown in Figure 5.

A port in casing 168, passage 88 and fluid couplings 188, 190 connect cushion pressure chamber 144 with a source of pressure (not shown). A port 160 in the casing, passage 162 in the orifice plate, the three-way valve 192 and couplings 194, 196, 198 interconnect the triggering pressure chamber with actuating pressure chamber 30.

In the operation of the embodiment of Figure 6, actuating pressure from chamber 30 is introduced as a triggering pressure into chamber 146 by means of the three-way valve 192 through the opening 160 in the casing 168, the passage 162 in the orifice wall and couplings 194, 196, 198. Reseating of the valve piston is effected by relieving the triggering pressure in chamber 146 by operating the valve 192. The set force of the actuating pressure on the valve piston effects reseating.

Certain advantages are provided by mounting of the casing 168 on the base member 170. There is a free flow of actuating pressure to the valve piston as it is unseated. A more rigid casing structure is provided, and rigidity is further enhanced by the provision of relatively small openings 186 in cap member 178. A degree of decelerating force may be exerted on the valve piston by compression within the piston and within the end cap 178, if the holes 186 are sufficiently small to restrict the passage of air therethrough as the valve piston is impelled from the orifice plate.

The metering member 132 on valve piston 124 in Figure 5 and the metering pin 172 on the actuator piston shown in Figure 6 are each contoured to control the output pressure-time pattern in the manner described in the co-pending application hereinbefore identified. Upon the elimination of the pressure seal about the orifice by the initial movement of the valve piston, the actuating pressure is released through a net orifice area which is governed by the metering member. A pressure drop is effected across the orifice and varies according to this net effective orifice area. The net output pressure and the force produced upon the actuator piston vary in accordance with the net flow area. Selected pressure-time or thrust-time patterns may be produced by appropriate metering pins. The manner of determining appropriate metering pin contours for selected output patterns is described in the co-pending application.

Those versed in the art will appreciate that the present invention achieves the objects and realizes the advantages hereinbefore mentioned. An improved pressure valve system is provided for the controlled high rate application or release of pressure. A single actuating pressure serves both the function of exerting a set force on a valve piston to urge it toward an orifice wall to establish a pressure seal about the orifice, and the function of exerting an opposing force on a portion of the valve piston outside the pressure seal. The actuating pressure alone therefore prepares the device to be operated by a triggering force which overbalances the forces on the valve piston. No special structure is required for decelerating the valve piston, because it is decelerated by the force of the actuating pressure and by the compression of a cushion pressure in a cushion pressure chamber defined by the valve piston and its associated casing. No special system is required for reseating the valve piston, because reseating pressure is introduced into the cushion pressure chamber. Certain embodiments of the invention are true valve devices, because triggering is effected by the application of triggering pressure to a transverse area of the valve piston to overbalance the forces on the valve piston. Therefore, no actuating piston or other member is required to close the orifice to confine pressure therein to effect the overbalancing action.

Orifice losses may be minimized by utilizing relatively large orifices, because advantageous ratios may be established between the valve piston area within the pressure seal and the annular piston portion outside this seal. It will be appreciated that the output of the pressure valve system or the output on the thrust column 40 is substantially unopposed by internal pressures or forces.

The valve piston assembly may be a relatively light structure. The valve casing assembly is not subjected to undesirably high dynamic loading. Only a relatively small area of the casing structure at the end opposite from the orifice wall is subjected to the actuating pressure during the opposing action of the actuating pressure to rapidly accelerate the valve piston from the orifice wall.

Although specific embodiments of the present invention have been described and illustrated in detail, it is to be clearly understood that the same are by way of illustration and example only; it is to be understood that the invention is not limited thereto, as many variations will be readily apparent to those versed in the art and the invention is to be given its broadest possible interpretation within the terms of the appended claims.

The inventor claims:

1. A pressure valve system comprising housing means, a wall defining an orifice within the housing means, a valve piston confronting the wall and adapted for cooperation with the wall to provide a pressure seal therebetween about said orifice, means for applying an actuating pressure to the valve piston to exert a set force thereon toward the wall to effect said pressure seal, and means for applying a triggering force to the valve piston to overbalance the set force to eliminate the pressure seal and expose an area of the valve piston to said actuating pressure, whereby the valve piston is accelerated from the wall to release the pressure through the orifice.

2. A pressure valve system comprising housing means, a wall defining an orifice within the housing means, a valve piston confronting the wall and adapted for co-operation with the wall to provide a pressure seal therebetween about said orifice, said valve piston having a substantially transverse shoulder area, means for applying an actuating pressure to the valve piston to exert a set force thereon toward the wall to effect said pressure seal, and means for applying a triggering pressure to said shoulder area to overbalance the set force to eliminate the pressure seal and expose an area of the valve piston to said actuating pressure, whereby the valve piston is accelerated from the wall to release the pressure through the orifice.

3. A pressure valve system comprising housing means, a wall defining an orifice within the housing means, a valve piston confronting the wall and adapted for cooperation with the wall to provide a pressure seal therebetween about said orifice, means for applying an actuating pressure to the valve piston to exert a set force thereon toward the wall to effect said pressure seal, means cooperating with an area of the valve piston to define a triggering pressure chamber, means for introducing a triggering pressure into the triggering pressure chamber to exert a triggering force on said valve piston area to overbalance the set force to eliminate the pressure seal and expose an area of the valve piston to said actuating pressure, whereby the valve piston is accelerated from the wall to release the pressure through the orifice.

4. A pressure valve system comprising housing means, a wall defining an orifice within the housing means, a valve piston confronting the wall and adapted for cooperation with the wall to provide a pressure seal therebetween about a piston area and said orifice, said valve piston having a substantially transverse shoulder area, means for applying an actuating pressure to the valve piston to exert a set force thereon toward the wall to effect said pressure seal, means for applying a triggering force to the valve piston to overbalance the set force to eliminate the pressure seal and expose said area of the valve piston within said seal to said actuating pressure, thereby accelerating the valve piston from the wall to release the actuating pressure through the orifice, and means cooperating with the valve piston to define a cushion chamber for applying a cushion pressure to said shoulder area to exert decelerating force on the valve piston.

5. A pressure valve system comprising housing means, a wall defining an orifice within the housing means, a valve piston confronting the wall and adapted for cooperation with the wall to provide a pressure seal therebetween about a piston area and said orifice, said valve piston having substantially transverse first and second oppositely facing shoulder areas, means for applying an actuating pressure to the valve piston to exert a set force thereon toward the wall to effect said pressure seal, means for applying a triggering pressure to the first shoulder area to overbalance the set force to eliminate the pressure seal and expose said piston area within said pressure seal to said actuating pressure, thereby accelerating the valve piston from the wall to release the actuating pressure through the orifice, and means cooperating with the valve piston to define a cushion chamber for applying pressure to the second shoulder area to exert a decelerating force on the valve piston.

6. A pressure valve system comprising housing means, a wall defining an orifice within the housing means, a valve piston confronting the wall, a resilient sealing element disposed between the valve piston and the wall and adapted to provide a pressure seal therebetween about said orifice, means for applying an actuating pressure to the valve piston both to exert a set force thereon toward the wall to effect said pressure seal, and means for applying a triggering force to the valve piston to overbalance the set force to eliminate the pressure seal and expose an area of the valve piston within said sealing element to said actuating pressure, whereby the valve piston is accelerated from the wall to release the pressure through the orifice.

7. A pressure valve system comprising housing means, a wall defining an orifice within the housing means, a release system casing secured to the wall on a first side thereof, a valve piston slidable in the casing and adapted for cooperation with said wall to provide a pressure seal therebetween about a piston area and said orifice, means establishing an actuating pressure on said first side of the wall, means defining an opening in the release system casing to admit the actuating pressure to the valve piston to exert a set force thereon to urge the valve piston toward the wall and effect said pressure seal, and means for applying a triggering force to the valve piston to overbalance the set force to eliminate the pressure seal and expose said piston area within said pressure seal to said actuating pressure, whereby the valve piston is accelerated from the wall to release the pressure through the orifice.

8. An actuating pressure valve system comprising housing means, a wall defining an orifice within the housing means, an actuator piston positioned on a first side of the wall, a release system assembly disposed on a second side of the wall, a valve piston positioned in the release system assembly and adapted for cooperation with the wall to provide a pressure seal therebetween abuot said orifice, means for establishing an actuating pressure to exert a set force on the valve piston urging the valve piston toward the second side of the wall to establish said pressure seal, and means for applying a triggering force to the valve piston to overbalance the set force and to eliminate the pressure seal and expose an area of the valve piston within the seal to said pressure, whereby the valve piston is accelerated from the wall to release the actuating pressure through the orifice onto the actuator piston to produce output thrust.

9. A pressure valve system comprising housing means, a wall defining an orifice within the housing means, a release system casing on one side of the wall, a valve piston positioned in the casing and adapted for cooperation with the wall to provide a pressure seal therebetween about said orifice, the valve piston having an axially extending enlarged portion and an axially extending reduced portion, said enlarged portion slidably engaging the casing and having a substantially transverse shoulder area, the casing, said reduced piston portion and the enlarged piston portion cooperating to define an expansible cushion pressure chamber, means for applying an actuating pressure to the valve piston both to exert a set force thereon toward the wall to effect said pressure seal, and means for applying a triggering force to the valve piston to overbalance the set force to expose an area of the valve piston to the pressure, thereby accelerating the valve piston from the wall to release the actuating pressure through the orifice, and means for establishing a cushion pressure in said cushion pressure chamber to act upon said transverse shoulder area to exert decelerating force on the valve piston.

10. A pressure valve system comprising housing means, a wall defining an orifice within the housing means, a release system casing on one side of the wall, a valve piston positioned in the casing and adapted for cooperation with the wall to provide a pressure seal therebetween about said orifice, the valve piston having an axially extending enlarged portion and an axially extending reduced portion, said enlarged portion slidably engaging the casing and having a substantially transverse shoulder area, the casing, said reduced piston portion and the enlarged piston portion cooperating to define an expansible cushion pressure chamber, means for applying an actuating pressure to the valve piston to exert a set force thereon toward the wall to effect said pressure seal, and means for applying a triggering force to the valve piston to overbalance the set force to expose an area of the valve piston to the pressure, thereby accelerating the valve piston from the wall to release the actuating pressure through the orifice, means for establishing a cushion pressure in said cushion pressure chamber to act upon said transverse shoulder area to exert a decelerating force on the valve piston, and means for establishing a reseating pressure in the cushion pressure chamber to act on said transverse shoulder area to urge the valve piston toward the wall against the opposing actuating pressure to prepare the pressure valve system for repeat operation.

11. An actuating pressure valve system comprising housing means, a wall defining an orifice within the housing means, an actuator piston positioned on a first side of the wall, a release system casing on a second side of the wall, a valve piston positioned in the casing and adapted for cooperation with the wall to provide a pressure seal therebetween about said orifice, the valve piston having an axially extending enlarged portion and an axially extending reduced portion, said enlarged portion slidably engaging the casing and having a substantially transverse shoulder area, the casing, said reduced piston portion and the enlarged piston portion cooperating to define an expansible cushion pressure chamber, means for applying an actuating pressure to the valve piston to exert a set force thereon toward the wall to effect said pressure seal, and means for applying a triggering force to the valve piston to overbalance the set force to expose an area of the release piston to the actuating pressure, thereby accelerating the release piston from the wall to release the actuating pressure through the orifice to produce output thrust on said actuator piston, and means for establishing a cushion pressure in said cushion pressure chamber to act upon said transverse shoulder area to exert decelerating force on the valve piston.

12. A pressure valve system comprising housing means, a wall defining an orifice within the housing means, a release system casing on one side of the wall, a valve piston positioned in the casing and adapted for cooperation with the wall to provide a pressure seal therebetween about said orifice, the valve piston having an axially extending enlarged portion and an axially extending reduced portion, said enlarged portion slidably engaging the casing and having a substantially transverse shoulder area, the casing, the reduced valve piston portion and the enlarged piston portion cooperating to define a triggering pressure chamber, means for establishing an actuating pressure to exert a set force urging the valve piston toward the wall to effect said pressure seal, and means for establishing a triggering pressure in said triggering pressure chamber to act on said transverse shoulder area, thereby overbalancing said set force to disengage the pressure seal and release the actuating pressure upon an area of the valve piston, whereby the valve piston is rapidly moved from said wall to release the pressure through the orifice.

13. A pressure valve system comprising housing means, a wall defining an orifice within the housing means, an actuator piston positioned on a first side of the wall, a release system casing on a second side of the wall, a valve piston positioned in the casing and adapted for cooperation with the wall to provide a pressure seal therebetween about said orifice, the valve piston having an axially extending enlarged portion and an axially extending reduced portion, said enlarged portion slidably engaging the casing and having a substantially transverse shoulder area, the casing, the reduced valve piston portion and the enlarged piston portion cooperating to define a triggering pressure chamber, means for establishing an actuating pressure to exert a set force urging the valve piston toward the wall to effect said pressure seal, and means for establishing a triggering pressure in said triggering pressure chamber to act on said transverse shoulder area, thereby overbalancing said set force to disengage the pressure seal and release the actuating pressure upon an area of the valve piston, thereby accelerating the valve piston from the wall to release the actuating pressure through the orifice upon the actuator piston to produce output thrust.

14. A pressure valve system comprising housing means, a wall defining an orifice between first and second chambers within the housing means, a release system assembly disposed in said second chamber, a valve piston positioned in the release system assembly and adapted for cooperation with said wall to provide a pressure seal therebetween about said orifice, said valve piston having an axially extending enlarged flange portion separating first and second axially extending reduced portions, said enlarged piston portion slidably engaging the casing and having substantially transverse oppositely facing first and second shoulder areas, the casing and the enlarged piston portion cooperating with said first and second reduced piston portions respectively to define an expansible triggering pressure chamber and an expansible cushion pressure chamber, means for establishing an actuating pressure to exert a set force urging the valve piston toward the wall to effect said pressure seal, means for establishing a triggering pressure in said triggering pressure chamber to act on said first transverse shoulder area, thereby overbalancing said set force to disengage said pressure seal and exopse an area of the valve piston to said pressure, thereby accelerating the valve piston from the wall to release the actuating pressure through the orifice, and means for establishing a cushion pressure in said cushion pressure chamber to act on said second shoulder area to exert decelerating force on the valve piston.

15. A pressure valve system comprising housing means, a wall defining an orifice between first and second chambers within the housing means, an actuator piston positioned in said first chamber, a release system assembly disposed in said second chamber, a valve piston positioned in the release system assembly and adapted for cooperation with said wall to provide a pressure seal therebetween about said orifice, said valve piston having an axially extending enlarged flange portion separating first and second axially extending reduced portions, said enlarged piston portion slidably engaging the casing and having substantially transverse oppositely facing first and second shoulder areas, the casing and the enlarged piston portion cooperating with said first and second reduced piston portions respectively to define an expansible triggering pressure chamber and an expansible cushion pressure chamber, means for establishing an actuating pressure to exert a set force urging the valve piston toward the wall to effect said pressure seal, means for establishing a triggering pressure in said triggering pressure chamber to act on said first transverse shoulder area, thereby overbalancing said set force to disengage said pressure seal and expose an area of the valve piston to said pressure, thereby accelerating the valve piston from the wall to release the actuating pressure through the orifice upon the actuator piston to produce output thrust, and means for establishing a cushion pressure in said cushion pressure chamber to act on said second shoulder area to exert decelerating force on the valve piston.

16. A pressure valve system comprising housing means, a wall defining an orifice within the housing means, a valve piston confronting the wall and adapted for cooperation with the wall to provide a pressure seal therebetween about said orifice, means for applying an actuating pressure to the valve piston both to exert a set force thereon toward the wall to effect said pressure seal, and means for applying a triggering force to the valve piston to overbalance the set force to eliminate the pressure seal and expose an area of the valve piston to said actuating pressure, thereby accelerating the valve piston from the wall to release the actuating pressure through the orifice, and a contoured metering member on the valve piston for regulating flow through the orifice to produce a predetermined pressure-time output pattern.

17. An actuating pressure valve system comprising housing means, a wall refining an orifice within the housing means, an actuator piston positioned on a first side of the wall, a valve piston positioned on a second side of the wall, the valve piston and the wall being adapted for cooperation to provide a pressure seal therebetween about said orifice, means for establishing an actuating pressure to exert a set force on the valve piston urging the release piston toward the second side of the wall to establish said pressure seal, and means for applying a triggering force to the valve piston to overbalance the set force to eliminate the pressure seal and expose an area of the valve piston to said pressure, thereby accelerating the valve piston from the wall to release the actuating pressure through the orifice upon said actuator piston, and a contoured metering member on the actuator piston for regulating flow through the orifice to produce a predetermined thrust-time output pattern on the actuator piston.

18. A pressure valve system comprising housing means, a wall defining an orifice within the housing means, a release system assembly mounted on a base member opposite the orifice wall, a valve piston slidable in said assembly and confronting the orifice wall, said valve piston being adapted for cooperation with the wall to provide a pressure seal therebetween about said orifice, means defining at least one opening in the release system assembly to admit the actuating pressure to the valve piston to exert a set force thereon to urge the valve piston toward the wall and effect said pressure seal, and means for applying a triggering force to the valve piston to overbalance the set force to eleminate the pressure seal and expose an area of the valve piston to said actuating pressure, whereby the valve piston is accelerated from the wall to release the actuating pressure through the orifice.

References Cited in the file of this patent

UNITED STATES PATENTS 2,925,803   Ottestad _____ Feb. 23, 1960